US012264377B2

(12) United States Patent
Park et al.

(10) Patent No.: US 12,264,377 B2
(45) Date of Patent: Apr. 1, 2025

(54) NON-ORIENTED ELECTRICAL STEEL SHEET AND METHOD FOR PRODUCING SAME

(71) Applicant: POSCO, Pohang-si (KR)

(72) Inventors: June Soo Park, Pohang-si (KR); Dae-Hyun Song, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 731 days.

(21) Appl. No.: 17/415,812

(22) PCT Filed: Dec. 18, 2019

(86) PCT No.: PCT/KR2019/018032

§ 371 (c)(1),
(2) Date: Jun. 18, 2021

(87) PCT Pub. No.: WO2020/130644

PCT Pub. Date: Jun. 25, 2020

(65) Prior Publication Data

US 2022/0056550 A1 Feb. 24, 2022

(30) Foreign Application Priority Data

Dec. 19, 2018 (KR) ........................ 10-2018-0165655

(51) Int. Cl.

| | |
|---|---|
| ***C21D 9/46*** | (2006.01) |
| ***C21D 6/00*** | (2006.01) |
| ***C21D 8/12*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/14*** | (2006.01) |
| ***C22C 38/16*** | (2006.01) |
| ***H01F 1/147*** | (2006.01) |

(52) U.S. Cl.

CPC ............... *C21D 9/46* (2013.01); *C21D 6/005* (2013.01); *C21D 6/008* (2013.01); *C21D 8/1222* (2013.01); *C21D 8/1233* (2013.01); *C21D 8/1272* (2013.01); *C22C 38/001* (2013.01); *C22C 38/002* (2013.01); *C22C 38/02* (2013.01); *C22C 38/04* (2013.01); *C22C 38/06* (2013.01); *C22C 38/14* (2013.01); *C22C 38/16* (2013.01); *H01F 1/147* (2013.01)

(58) Field of Classification Search

None

See application file for complete search history.

(56) References Cited

U.S. PATENT DOCUMENTS 10,844,451 B2 * 11/2020 Zhang ..................... C22C 38/06
2017/0211161 A1 7/2017 Nakanishi et al.
2017/0314090 A1 11/2017 Okubo et al.

FOREIGN PATENT DOCUMENTS

| | | | |
|---|---|---|---|
| CN | 101906577 | A | 12/2010 |
| CN | 104789862 | A | 7/2015 |
| CN | 105121683 | A | 12/2015 |
| CN | 107794439 | A | 3/2018 |
| EP | 3395962 | A1 | 10/2018 |
| JP | H06-192731 | A | 7/1994 |
| JP | H07-150248 | A | 6/1995 |
| JP | H08-134606 | A | 5/1996 |
| JP | 2001-049402 | A | 2/2001 |
| JP | 2001-073097 | A | 3/2001 |
| JP | 2001-123252 | A | 5/2001 |
| JP | 2001-323351 | A | 11/2001 |
| JP | 2004-332031 | A | 11/2004 |
| JP | 2005-200713 | A | 7/2005 |
| JP | 2006-241554 | A | 9/2006 |
| JP | 2018-070955 | A | 5/2018 |
| JP | 2018-115362 | A | 7/2018 |
| JP | 2018-154853 | A | 10/2018 |
| KR | 10-2004-0026041 | A | 3/2004 |
| KR | 10-2004-0056629 | A | 7/2004 |
| KR | 10-2012-0105051 | A | 9/2012 |
| KR | 10-1263139 | B1 | 5/2013 |
| KR | 10-2015-0016434 | A | 2/2015 |
| KR | 10-2016-0018644 | A | 2/2016 |
| KR | 10-1665951 | B1 | 10/2016 |

(Continued)

OTHER PUBLICATIONS

Extended European Search Report dated Jun. 8, 2022 issued European Patent Application No. 19900038.1.
Indian Office Action dated Mar. 15, 2022 issued in Indian Patent Application No. 202137031704 (with English 1 translation).
International Search Report (with partial translation) and Written Opinion dated Aug. 7, 2020, issued in corresponding International Patent Application No. PCT/KR2019/018032.
Chinese Office Action dated Apr. 26, 2022 issued in Chinese Patent Application No. 201980084786.0.
Japanese Office Action dated Feb. 18, 2025 issued in Japanese Patent Application No. 2024-000370 (with English translation).

*Primary Examiner* — Xiaowei Su
(74) *Attorney, Agent, or Firm* — Morgan, Lewis & Bockius LLP

(57) ABSTRACT

A non-oriented electrical steel sheet according to an embodiment of the present invention includes, in wt %, C at 0.005% or less (excluding 0%), Si at 0.5 to 2.4%, Mn at 0.4 to 1.0%, S at 0.005% or less (excluding 0%), Al at 0.01% or less (excluding 0%), N at 0.005% or less (excluding 0%), Ti at 0.005% or less (excluding 0%), Cu at 0.001 to 0.02%, and the balance of Fe and inevitable impurities, and satisfies Formula 1 below, wherein a volume fraction of grains in which an angle formed by a {111} surface and a rolling surface of the steel sheet is 15° or less is 27% or more.

$$[Mn]/([Si]+150\times[Al])\leq 0.35 \quad \text{[Formula 1]}$$

(In Formula 1, [Mn], [Si], and [Al] are contents (wt %) of Mn, Si, and Al, respectively.)

12 Claims, No Drawings

(56) References Cited

FOREIGN PATENT DOCUMENTS

| | | | |
|---|---|---|---|
| KR | 10-1701195 | B1 | 2/2017 |
| KR | 10-1707452 | B1 | 2/2017 |
| KR | 10-1722702 | B1 | 4/2017 |
| KR | 10-2017-0117568 | A | 10/2017 |
| KR | 10-2241985 | B1 | 4/2021 |
| WO | WO2016067568 | A1 | 4/2017 |
| WO | WO2017056383 | A1 | 10/2017 |
| WO | 2018/220839 | A1 | 12/2018 |

* cited by examiner

NON-ORIENTED ELECTRICAL STEEL SHEET AND METHOD FOR PRODUCING SAME

CROSS-REFERENCE OF RELATED APPLICATIONS

This application is the U.S. National Phase under 35 U.S.C. § 371 of International Application No. PCT/KR2019/018032 filed on Dec. 18, 2019, which claims the benefit of Korean Application No. 10-2018-0165655 filed on Dec. 19, 2018, the entire contents of each are hereby incorporated by reference.

TECHNICAL FIELD

The present invention relates to a non-oriented electrical steel sheet and a manufacturing method thereof. Specifically, the present invention relates to a non-oriented electrical steel sheet and a manufacturing method thereof that may omit hot-rolled sheet annealing and improve magnetism at the same time.

BACKGROUND ART

A motor or generator is an energy conversion device that converts electrical energy into mechanical energy or mechanical energy into electrical energy, and recently, as regulations on environmental preservation and energy saving are strengthened, demands for improving the efficiency of the motor or generator are increasing, and accordingly, there is an increasing demand for development of materials having excellent properties even in a non-oriented electrical steel sheet used as materials for iron cores such as for motors, generators, and small transformers. For the motor or generator, energy efficiency refers to a ratio of input energy to output energy, and in order to improve the efficiency, it is important to consider how much energy loss such as iron loss, copper loss, and mechanical loss, which are substantially lost in the energy conversion process, may be reduced, wherein the reason is that the iron loss and copper loss thereof are considerably influenced by the properties of the non-oriented electrical steel sheet. Typical magnetic properties of the non-oriented electrical steel are iron loss and magnetic flux density, and the lower the iron loss of the non-oriented electrical steel sheet, the less iron loss occurs in a process of magnetizing an iron core, thereby improving efficiency, and since the higher the magnetic flux density, the larger a magnetic field may be induced with the same energy, and since less current may be applied to obtain the same magnetic flux density, energy efficiency may be improved by reducing copper loss. Therefore, in order to improve the energy efficiency, it may be essential to develop a magnetically excellent non-oriented electrical steel sheet with low iron loss and high magnetic flux density. As an efficient method to reduce the iron loss of the non-oriented electrical steel sheet, there is a method of increasing addition amounts of Si, Al, and Mn, which are elements with high specific resistance. However, increasing the addition amount of Si, Al, and Mn increases the specific resistance of the steel, thereby reducing the eddy current loss among the iron loss of the non-oriented electrical steel sheet, so it is possible to reduce the iron loss, but the iron loss does not unconditionally decrease in proportion to the addition amount as the addition amount increases, and on the contrary, since an increase in the amount of alloying elements added leads to inferior magnetic flux density, it is difficult to optimize the component system and manufacturing process to ensure excellent magnetic flux density while lowering iron loss. However, improving a texture is a method that may not sacrifice either the iron loss or the magnetic flux density to improve them at the same time. To this end, in the non-oriented electrical steel sheet having excellent magnetic properties, a method for improving the texture is widely used by performing a hot-rolled sheet annealing process before cold-rolling a hot-rolled sheet after hot-rolling a slab for a purpose of improving the texture. However, this method also causes an increase in manufacturing cost due to an addition of the hot-rolled sheet annealing process, and when crystal grains are coarsened by performing the hot-rolled sheet annealing, the cold-rolling property may be deteriorated. Therefore, if a non-oriented electrical steel sheet having excellent magnetic properties may be manufactured without performing the hot-rolled sheet annealing process, the manufacturing cost may be reduced and the problem of productivity according to the hot-rolled sheet annealing process may be solved.

DISCLOSURE

Description of the Drawings

A non-oriented electrical steel sheet and a manufacturing method thereof are provided. Specifically, a non-oriented electrical steel sheet and a manufacturing method thereof that may omit hot-rolled sheet annealing and improve magnetism at the same time, are provided.

A non-oriented electrical steel sheet according to an embodiment of the present invention includes, in wt %: C at 0.005% or less (excluding 0%), Si at 0.5 to 2.4%, Mn at 0.4 to 1.0%, S at 0.005% or less (excluding 0%), Al at 0.01% or less (excluding 0%), N at 0.005% or less (excluding 0%), Ti at 0.005% or less (excluding 0%), Cu at 0.001 to 0.02%, and the balance of Fe and inevitable impurities, and satisfies Formula 1 below, wherein a volume fraction of grains in which an angle formed by a {111} surface and a rolling surface of the steel sheet is 15° or less is 27% or more.

$$[Mn]/([Si]+150\times[Al])\leq 0.35 \quad \text{[Formula 1]}$$

(In Formula 1, [Mn], [Si], and [Al] are contents (wt %) of Mn, Si, and Al, respectively.)

A volume fraction of grains in which an angle formed by a {111} surface and a rolling surface of the steel sheet may be 15° or less is 27% to 32%.

A concentration layer including a Si oxide may exist in a depth range of 0.15 μm or less from a surface.

The concentration layer may include Si at 3 wt % or more, O at 5 wt % or more, and Al at 0.5 wt % or less.

Sulfides may be included, and a product ($F_{count}\times F_{area}$) of a number ratio ($F_{count}$) of sulfides having a diameter of 0.05 μm or more among sulfides having a diameter of 0.5 μm or less and an area ratio ($F_{area}$) of sulfides having a diameter of 0.05 μm or more among sulfides having a diameter of 0.5 μm or less may be 0.15 or more.

Sulfides may be included, and a number ratio ($F_{count}$) of sulfides having a diameter of 0.05 μm or more among sulfides having a diameter of 0.5 μm or less may be 0.2 or more.

An area ratio ($F_{area}$) of sulfides having a diameter of 0.05 μm or more among sulfides having a diameter of 0.5 μm or less may be 0.5 or more.

$0.9\leq(V_{cube}+V_{goss}+V_{r\text{-}cube})/\text{Intensity}_{max}\leq 2.5$ may be satisfied.

(Wherein $V_{cube}$, $V_{goss}$, and $V_{r\text{-}cube}$ are vol % of a texture of a cube, a goss, and a rotated cube, respectively, and $intensity_{max}$ represents a maximum intensity value on an ODF image (Φ2=45 degree section)).

YP/TS≥0.7 may be satisfied.

(Herein, YP stands for a yield strength and TS stands for a tensile strength.)

An area ratio of fine grains having an average grain diameter of 0.3 times or less may be 0.4% or less, and an area ratio of coarse grains having an average grain diameter of two or more times may be 40% or less.

The average grain diameter may be 50 to 100 μm.

A manufacturing method of a non-oriented electrical steel sheet according to an embodiment of the present invention includes: heating a slab including, in wt %: C at 0.005% or less (excluding 0%), Si at 0.5 to 2.4%, Mn at 0.4 to 1.0%, S at 0.005% or less (excluding 0%), Al at 0.01% or less (excluding 0%), N at 0.005% or less (excluding 0%), Ti at 0.005% or less (excluding 0%), Cu at 0.001 to 0.02%, and satisfying Formula 1 below; hot-rolling the slab to manufacture a hot-rolled sheet; cold-rolling the hot-rolled sheet without annealing the hot-rolled sheet to manufacture a cold-rolled sheet; and final-annealing the cold-rolled sheet.

$$[Mn]/([Si]+150\times[Al])\leq 0.35 \qquad \text{[Formula 1]}$$

(In Formula 1, [Mn], [Si], and [Al] are contents (wt %) of Mn, Si, and Al, respectively.)

In the final-annealing, components of Si and Al, and a hydrogen atmosphere ($H_2$) in an annealing furnace, may satisfy 10×([Si]+1000×[Al])−[H2]≤90.

(Herein, [Si] and [Al] represent contents (wt %) of Si and Al, respectively, and [$H_2$] represents a volume fraction (vol %) of hydrogen in the annealing furnace.)

In the heating of the slab, an equilibrium precipitation amount ($MnS_{SRT}$) of MnS and a maximum precipitation amount ($MnS_{Max}$) of MnS satisfy the following formula.

$$MnS_{SRT}/MnS_{Max}\geq 0.6$$

In the heating of the slab, when an equilibrium temperature at which austenite is 100% transformed into ferrite is A1 (C), a slab heating temperature SRT (° C.) and a temperature (° C.) of the A1 may satisfy the following formula.

$$SRT\geq A1+150°\text{ C.}$$

The heating of the slab may be maintained for 1 hour or more in an austenite single phase region.

The hot-rolling may include rough-rolling and finishing-milling, and a finishing-milling start temperature (FET) may satisfy the following formula.

$$Ae1\leq FET\leq(2\times Ae3+Ae1)/3$$

(Herein, Ae1 represents a temperature (° C.) at which austenite is completely transformed into ferrite, Ae3 represents a temperature (° C.) at which austenite begins to transform into ferrite, and FET represents a finishing-milling start temperature (° C.).

The hot-rolling may include rough-rolling and finishing-milling, and a reduction ratio in the finishing-milling may be 85% or more.

The hot-rolling may include rough-rolling and finishing-milling, and a reduction ratio at a front stage of the finishing-milling may be 70% or more.

The hot-rolling may include rough-rolling and finishing-milling, and a deviation of an end temperatures (FDT) of the finishing-milling in an entire length of the hot-rolled sheet may be 30° C. or less.

The hot-rolling may include rough-rolling, finishing-milling, and winding, and a temperature (CT) at the winding may satisfy the following formula.

$$0.55\leq CT\times[Si]/1000\leq 1.75$$

(Herein, CT represents a temperature (° C.) in the winding, and [Si] represents a content (wt %) of Si.

A microstructure of the hot-rolled sheet may satisfy the following formula.

$$GS_{center}/GS_{surface}\geq 1.15$$

(Herein, $GS_{center}$ represents an average grain diameter of (¼)t to (¾)t portions in a thickness direction, and $GS_{surface}$ represents an average grain diameter from a surface to (¼)t portion.

A microstructure of the hot-rolled sheet may satisfy the following formula.

$$GS_{center}\times\text{recrystallization rate}/10\geq 2$$

(Herein, $GS_{center}$ represents an average grain diameter of (¼)t to (¾)t portions in a thickness direction, and a recrystallization rate represents an area fraction of a grain recrystallized after the hot-rolling.)

According to the embodiment of the present invention, even if a non-oriented electrical steel sheet is processed, magnetism does not deteriorate, and the magnetism is excellent before and after processing.

Therefore, after processing, stress relief annealing (SRA) for magnetism improvement is not required.

MODE FOR INVENTION

It will be understood that, although the terms first, second, third, etc. may be used herein to describe various elements, components, regions, areas, zones, layers, and/or sections, they are not limited thereto. These terms are only used to distinguish one element, component, region, area, zone, layer, or section from another element, component, region, layer, or section. Therefore, a first part, component, region, area, zone, layer, or section to be described below may be referred to as second part, component, area, layer, or section within the range of the present invention.

The technical terms used herein are to simply mention a particular embodiment and are not meant to limit the present invention. An expression used in the singular encompasses an expression of the plural, unless it has a clearly different meaning in the context. In the specification, it is to be understood that the terms such as "including", "having", etc., are intended to indicate the existence of specific features, regions, numbers, stages, operations, elements, components, and/or combinations thereof disclosed in the specification, and are not intended to preclude the possibility that one or more other features, regions, numbers, stages, operations, elements, components, and/or combinations thereof may exist or may be added.

When referring to a part as being "on" or "above" another part, it may be positioned directly on or above another part, or another part may be interposed therebetween. In contrast, when referring to a part being "directly above" another part, no other part is interposed therebetween.

Unless otherwise stated, % means wt %, and 1 ppm is 0.0001 wt %.

In embodiments of the present invention, inclusion of an additional element means replacing the balance of iron (Fe) by an additional amount of the additional elements.

Unless otherwise defined, all terms used herein, including technical or scientific terms, have the same meanings as those generally understood by those with ordinary knowledge in the field of art to which the present invention belongs. Terms defined in commonly used dictionaries are further interpreted as having meanings consistent with the relevant technical literature and the present disclosure, and are not to be construed as having idealized or very formal meanings unless defined otherwise.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

A non-oriented electrical steel sheet according to an embodiment of the present invention includes, in wt %: C at 0.005% or less (excluding 0%), Si at 0.5 to 2.4%, Mn at 0.4 to 1.0%, S at 0.005% or less (excluding 0%), Al at 0.01% or less (excluding 0%), N at 0.005% or less (excluding 0%), Ti at 0.005% or less (excluding 0%), Cu at 0.001 to 0.02%, and the balance of Fe and inevitable impurities.

Hereinafter, the reason for limiting the components of the non-oriented electrical steel sheet will be described.

C at 0.005 wt % or less

Carbon (C) is combined with Ti, Nb, etc. to form a carbide to degrade magnetism, and when used after processing from the final product to an electrical product, since iron loss increases due to magnetic aging to decreases efficiency of electrical equipment, it should be less than 0.005 wt %. Specifically, C may be included in an amount of 0.0001 to 0.0045 wt %.

Si at 0.5 to 2.4 wt %

Silicon (Si) is a major element added to reduce eddy current loss of iron loss by increasing specific resistance of steel. When too little Si is added, iron loss is deteriorated. Conversely, when too much Si is added, an austenite area is reduced, thus when a hot-rolled sheet annealing process is omitted, an upper limit thereof may be limited to 2.4 wt % in order to utilize a phase transformation phenomenon. Specifically, Si may be included in an amount of 0.6 to 2.37 wt %.

Mn at 0.4 to 1.0 wt %

Manganese (Mn) is an element that lowers iron loss by increasing specific resistance along with Si and Al, and that improves texture. When an addition amount thereof is small, an effect of increasing specific resistance is small, but unlike Si and Al, an addition appropriate amount thereof is required depending on addition amounts of Si and Al as an austenite stabilizing element. When the addition amount thereof is too large, the magnetic flux density may be considerably reduced. Specifically, Mn may be included in an amount of 0.4 to 0.95 wt %.

S at 0.005 wt % or less

Sulfur(S) is an element that forms sulfides such as MnS, CuS, and (Cu, Mn) S, which are undesirable for magnetic properties, so it may be added as low as possible. When too much sulfur is added, magnetism may deteriorate due to increase in fine sulfides. Specifically, S may be included in an amount of 0.0001 to 0.0045 wt %.

Al at 0.01 wt % or less

Aluminum (Al) serves an important role in reducing iron loss by increasing specific resistance along with Si, but it is an element that stabilizes ferrite more than Si and greatly reduces a magnetic flux density as an added amount increases. In the embodiment of the present invention, since the hot-rolled sheet annealing is omitted by utilizing the phase transformation phenomenon, the content of Al is limited. Specifically, Al may be contained in an amount of 0.0001 to 0.0095 wt %.

N at 0.005 wt % or less

Nitrogen (N) is an element that is undesirable to magnetism such as forming a nitride by strongly combining with Al, Ti, Nb, etc. to inhibit crystal grain growth, so it may be included less. Specifically, N may be included in an amount of 0.0001 to 0.0045 wt %.

Ti at 0.005 wt % or less

Titanium (Ti) combines with C and N to form fine carbides and nitrides to inhibit crystal grain growth, and as an addition amount of titanium (Ti) is increased, a texture is deteriorated due to the increased carbides and nitrides, so that magnetism is deteriorated, and thus it may be included less. Specifically, Ti may be included in an amount of 0.0001 to 0.0045 wt %.

Cu at 0.001 to 0.02 wt %

Copper (Cu) is an element that forms a (Mn, Cu) S sulfide together with Mn, and when an addition amount thereof is large, it forms fine sulfides to degrade magnetism, so the addition amount thereof may be limited to 0.001 to 0.02 wt %. Specifically, Cu may be included in an amount of 0.0015 to 0.019 wt %.

In addition to the above elements, P, Sn, and Sb, which are known as elements that improve texture, may be added to further improve magnetism. However, when addition amounts thereof are too large, since they may inhibit grain growth and degrade productivity, the addition amounts thereof may be controlled so that each addition amount may be 0.1 wt % or less.

Ni and Cr, which are elements inevitably added in the steel making process, react with impurity elements to form fine sulfides, carbides, and nitrides to undesirably affect magnetism, so each of them may be limited to 0.05 wt % or less.

In addition, since Zr, Mo, V, etc. are also elements strongly forming a carbonitride, it is preferable that they are not added as much as possible, and they may be contained in an amount of 0.01 wt % or less, respectively.

The balance includes Fe and inevitable impurities. The inevitable impurities are impurities mixed in the steel-making and the manufacturing process of the grain-oriented electrical steel sheet, which are widely known in the field, and thus a detailed description thereof will be omitted. In the embodiment of the present invention, the addition of elements other than the above-described alloy components is not excluded, and various elements may be included within a range that does not hinder the technical concept of the present invention. When the additional elements are further included, they replace the balance of Fe.

The non-oriented electrical steel sheet according to the embodiment of the present invention may satisfy Formula 1 below.

$$[Mn]/([Si]+150\times[Al])\leq 0.35 \quad \text{[Formula 1]}$$

(In Formula 1, [Mn], [Si], and [Al] are contents (wt %) of Mn, Si, and Al, respectively.)

The non-oriented electrical steel sheet according to the embodiment of the present invention may satisfy Formula 2 below.

$$0.19\leq[Mn]/([Si]+150\times[Al])\leq 0.35 \quad \text{[Formula 2]}$$

(In Formula 2, [Mn], [Si], and [Al] are contents (wt %) of Mn, Si, and Al, respectively.)

In the case of Al, the effect of stabilizing ferrite is very high, so it should be added in a trace amount, and Mn needs to be added in an appropriate amount or more for sulfide coarsening. When Formula 1 is satisfied, it has a sufficient austenite single-phase region at high temperature, it is possible to secure a recrystallization structure after hot-rolling through the phase transformation during the hot-rolling, and coarse sulfide formation is possible through hot-rolling recrystallization temperature control. In addition, when Formula 1 is satisfied, it is possible to inhibit formation of an oxide layer by controlling an atmosphere in an annealing furnace during final annealing.

In the embodiment of the present invention, a volume fraction of grains in which a {111} surface of the steel sheet forms an angle of 15° or less with the rolled surface may be 27% or more. In the embodiment of the present invention, by omitting the hot-rolled sheet annealing, the volume fraction of the grain in which the {111} surface of the steel sheet forms an angle of 15° or less with the rolled surface is increased. However, by controlling the alloy composition and process conditions to be described later, it is possible to improve magnetism. Specifically, the volume fraction of the grain in which the {111} surface of the steel sheet forms an angle of 15° or less with the rolled surface may be 27 to 35%.

In the embodiment of the present invention, a concentration layer including a Si oxide may exist in a depth range of 0.15 μm or less from a surface. Since the concentration layer including the Si oxide degrades the magnetism, it is necessary to control a formation thickness thereof as thin as possible. In the embodiment of the present invention, the thickness of the concentrated layer may be 0.15 μm or less. Specifically, the thickness of the concentration layer may be 0.01 to 0.13 μm.

The concentration layer may include Si at 3 wt % or more, O at 5 wt % or more, and Al at 0.5 wt % or less. The concentration layer is distinguished from a steel sheet substrate in that it includes Si at 3 wt % or more and O at 5 wt % or more. When Al is concentrated on the surface, it may be a cause of deteriorating magnetism, but as described above, since the content of Al in the embodiment of the present invention is limited, Al is included in 0.5 wt % or less even in the concentration layer, so that it is possible to prevent the magnetism from deteriorating. A control method of the concentration layer will be described in detail in a manufacturing method of a non-oriented electrical steel sheet to be described later.

In addition, in the embodiment of the present invention, the magnetism may be improved by controlling the number and area ratio of sulfides having a specific diameter. Specifically, the finer the sulfide, the more inhibited the grain growth and hindered the movement of the magnetic domain, thereby deteriorating the magnetism. Accordingly, in the embodiment of the present invention, by coarsening sulfides having a specific size to increase the number thereof having 0.05 μm or more in diameter and to increase the area ratio, it is possible to improve the magnetism.

Specifically, the sulfides are included, and a product ($F_{count} \times F_{area}$) of a number ratio ($F_{count}$) of sulfides having a diameter of 0.05 μm or more among sulfides having a diameter of 0.5 μm or less and an area ratio ($F_{area}$) of sulfides having a diameter of 0.05 μm or more among sulfides having a diameter of 0.5 μm or less may be 0.15 or more. Specifically, it may be 0.15 to 03.

The sulfides are included, and a number ratio ($F_{count}$) of sulfides having a diameter of 0.05 μm or more among sulfides having a diameter of 0.5 μm or less may be 0.2 or more. More specifically, it may be 0.2 to 05.

An area ratio ($F_{area}$) of sulfides having a diameter of 0.05 μm or more among sulfides having a diameter of 0.5 μm or less may be 0.5 or more. Specifically, it may be 0.5 to 0.8. The sulfide may include MnS, CuS, or a composite of MnS and CuS.

A method of controlling the number ratio and the area ratio of sulfides will be described in detail in a manufacturing method of a non-oriented electrical steel sheet to be described later.

In addition, in the embodiment of the present invention, the magnetism may be improved by controlling the texture.

$0.9 \le (V_{cube}+V_{goss}+V_{r\text{-}cube})/\text{Intensity}_{max} \le 2.5$ may be satisfied.

(Herein, $V_{cube}$, $V_{goss}$, and $V_{r\text{-}cube}$ are vol % of a texture of a cube, a goss, and a rotated cube, respectively, and $\text{Intensity}_{max}$ represents a maximum intensity value on an ODF image (Φ2=45 degree section)).

$V_{cube}$, $V_{goss}$, and $V_{r\text{-}cube}$ are vol % of a texture within 15° from (100)[001], (110)[001], and (100)[011], respectively.

In the embodiment of the present invention, the cube, the goss, and the rotated cube, which are advantageous for magnetism among the texture, are more developed to satisfy the above-described relational expression, and as a result, the magnetism is improved.

A method of controlling the texture will be described in detail in the manufacturing method of the non-oriented electrical steel sheet to be described later.

In addition, in general, when the hot-rolled sheet annealing process is omitted, the maximum intensity is significantly increased due to reinforcement of a texture that is disadvantageous to magnetism more than when the hot-rolled sheet annealing process is performed.

On the other hand, in the embodiment of the present invention, the increase of the intensity is not large, and the relational formula of Intensity(max, HB)/Intensity(max, HBA)≤1.5 is satisfied.

(Herein, Intensity(max, HB) and Intensity(max, HBA) represent the maximum strength of the texture when the hot-rolled sheet annealing is not performed and when the hot-rolled sheet annealing is performed, respectively.)

That is, even though the hot-rolled sheet annealing is omitted, it has excellent magnetism.

In the embodiment of the present invention, a ratio of YP/TS is high because the hot-rolled sheet annealing is omitted. Specifically, YP/TS≥0.7 may be satisfied. Herein, YP stands for a yield strength and TS stands for a tensile strength. Machinability is improved due to the high YP/TS, and a magnetism deterioration phenomena due to deformation may be suppressed when products such as motors manufactured by using the non-oriented electrical steel sheet are driven.

In addition, in the embodiment of the present invention, the magnetism may be improved by controlling distribution of grain diameters. The iron loss reacts sensitively to the grain diameter, and when the grain diameter is too large or too small, the iron loss increases. Specifically, an area ratio of fine grains having an average grain diameter of 0.3 times or less may be 0.4% or less, and an area ratio of coarse grains having an average grain diameter of two or more times may be 40% or less.

In addition, the average grain diameter may be 50 to 100 μm. In the embodiment of the present invention, a measurement criterion for the grain diameter may be a surface parallel to the rolled surface (ND surface). The grain diameter means, by assuming an imaginary sphere having the same area, a diameter of the sphere.

A method of controlling distribution of the grain diameter will be described in detail in the manufacturing method of the non-oriented electrical steel sheet to be described later.

The non-oriented electrical steel sheet according to the embodiment of the present invention has excellent iron loss and magnetic flux density by the above-described alloy components and characteristics.

Specifically, the iron loss (W15/50) when the magnetic flux density of 1.5 Tesla is induced at a frequency of 50 Hz may be 3.5 W/Kg or less. Specifically, it may be 2.5 to 3.5 W/Kg.

When the magnetic field of 5000 A/m is applied, the induced magnetic flux density (B50) may be 1.7 Tesla or more. Specifically, it may be 1.7 to 1.8 Tesla. A measurement standard thickness of the magnetism may be 0.50 mm.

The non-oriented electrical steel sheet according to the embodiment of the present invention may satisfy the following formula.

$$(W15/50_C - W15/50_L)/(W15/50_C + W15/50_L) \times 100 \geq 7$$

$W15/50_L$ and $W15/50_C$ mean the iron loss (W15/50) in the rolling direction and the rolling vertical direction, respectively.

$$B50_L - B50_C \geq 0.006$$

$B50_L$ and $B50_C$ mean the magnetic flux density (B50) in the rolling direction and the rolling vertical direction, respectively.

By satisfying the above-described relationship, the magnetic flux density in the rolling direction may be further improved, so that the average magnetic flux density may be improved.

A manufacturing method of a non-oriented electrical steel sheet according to an embodiment of the present invention includes: heating a slab; hot-rolling the slab to manufacture a hot-rolled sheet; cold-rolling the hot-rolled sheet without annealing the hot-rolled sheet to manufacture a cold-rolled sheet; and final annealing the cold-rolled sheet.

First, the slab is heated.

The alloy components of the slab have been described in the alloy components of the above-described non-oriented electrical steel sheet, so duplicate descriptions thereof will be omitted. Since the alloy compositions are not substantially changed during the manufacturing process of the non-oriented electrical steel sheet, the alloy compositions of the non-oriented electrical steel sheet and the slab are substantially the same.

Specifically, the slab may include, in wt %; C at 0.005% or less (excluding 0%), Si at 0.5 to 2.4%, Mn at 0.4 to 1.0%, S at 0.005% or less (excluding 0%), Al at 0.01% or less (excluding 0%), N at 0.005% or less (excluding 0%), Ti at 0.005% or less (excluding 0%), and Cu at 0.001 to 0.02%, and it may satisfy Formula 1 below.

$$[Mn]/([Si]+150\times[Al]) \leq 0.35 \quad \text{[Formula 1]}$$

(In Formula 1, [Mn], [Si], and [Al] are contents (wt %) of Mn, Si, and Al, respectively.)

Other additional elements of the slab have been described in the alloy components of the non-oriented electrical steel sheet, so duplicate descriptions thereof will be omitted.

In the heating of the slab, when an equilibrium temperature at which austenite is 100% transformed into ferrite is A1 (° C.), a slab heating temperature SRT (° C.) and the A1 temperature (° C.) may satisfy the following formula.

$$SRT \geq A1 + 150° \text{ C.}$$

When the slab heating temperature is high enough to satisfy the above-described range, a recrystallized structure may be sufficiently secured after the hot-rolling, and even if hot-rolled sheet annealing is not performed, the magnetism may be improved.

The A1 temperature (° C.) is determined by the alloy composition of the slab. This widely known in the art, so a detailed description thereof will be omitted. For example, it may be calculated by a commercial thermodynamic program such as Thermo-Calc., Factsage, etc.

In the heating of the slab, an equilibrium precipitation amount ($MnS_{SRT}$) of MnS and a maximum precipitation amount ($MnS_{Max}$) of MnS may satisfy the following formula.

$$MnS_{SRT}/MnS_{Max} \geq 0.6$$

When a slab reheating temperature is too high, MnS is re-dissolved, and finely precipitated in the hot-rolling and annealing processes, and when it is too low, it is advantageous for coarsening of MnS, but hot-rolling property is deteriorated, and it is difficult to secure the recrystallized structure after the hot-rolling due to insufficient phase transformation section.

In this case, the equilibrium precipitation amount ($MnS_{SRT}$) of MnS means an amount in which MnS may be thermodynamically equilibrium-precipitated at the slab heating temperature (SRT), and the maximum precipitation amount ($MnS_{Max}$) of MnS means a theoretical maximum amount in which MnS may be thermodynamically precipitated from the Mn and S alloy elements present in the slab.

In the heating of the slab, it may be maintained for 1 hour or more in an austenite single phase area. This is a time required for coarsening of sulfides, and is also necessary to coarsen the recrystallized structure after the hot-rolling by coarsening the grain of austenite before the hot-rolling.

Next, the slab is hot-rolled to manufacture the hot-rolled sheet. The manufacturing of the hot-rolled sheet by the hot-rolling may specifically include rough-rolling, finishing-milling, and winding.

In the embodiment of the present invention, by appropriately controlling a reduction ratio and a temperature of the rough-rolling, the finishing-milling, and the winding, it is possible to improve the magnetism even if the hot-rolled sheet annealing is not performed.

First, the rough-rolling is a step of rough-rolling the slab to manufacture a bar.

The finishing-milling step is a step of manufacturing a hot-rolled sheet by rolling the bar.

The winding is a step of winding the hot-rolled sheet.

When the phase transformation is finished, in the finishing-milling, the transformed structure remains as it is, and it refines the microstructure of the non-oriented electrical steel sheet, and makes the texture of the non-oriented electrical steel inferior, considerably reducing the magnetism. Conversely, when too much phase transformation occurs in the finishing milling, and when the grains of the hot-rolled recrystallized structure are refined, the effect of improving the texture due to the strain energy decreases, and finally, the magnetism is considerably deteriorated.

When a start temperature (FET) of the finishing-milling satisfies the following relationship, after the final annealing, the cube, the goss, and the rotated cube, which are advantageous textures for magnetism, develop better and the magnetism may be improved.

$$Ae1 \leq FET \leq (2\times Ae3 + Ae1)/3$$

Herein, Ae1 represents a temperature (° C.) at which austenite is completely transformed into ferrite, Ae3 represents a temperature (° C.) at which austenite begins to transform into ferrite, and FET represents a finishing-milling start temperature (° C.).

Specifically, by controlling the start temperature (FET) of the finishing-milling, $0.9 \le (V_{cube}+V_{goss}+V_{r\text{-}cube})/\text{Intensity}_{max} \le 2.5$ may be satisfied.

A temperature (° C.) of Ae1 and a temperature (° C.) of Ae3 are determined by the alloy compositions of the slab. This is widely known in the art, so a detailed description thereof will be omitted.

In addition, the reduction ratio in the finishing-milling may also contribute to the above-described texture development. Specifically, the reduction ratio of the finishing-milling may be 85% or more. When the finishing-milling is composed of a plurality of passes, the reduction ratio of the finishing-milling may be a cumulative reduction ratio of the plurality of passes. Specifically, the reduction ratio of the finishing-milling may be 85 to 90%.

A reduction ratio at a front stage of the finishing-milling may be 70% or more. The front stage of the finishing-milling means up to "(total number of passes)/2" when the finishing-milling is performed with two or more even passes. It means up to "(total number of passes+1)/2" when the finishing-milling is performed with two or more odd passes. Specifically, the reduction ratio at the front stage of the finishing-milling may be 70 to 87%.

A deviation of finishing temperatures (FDT) of the finishing-milling in an entire length of the hot-rolled sheet may be 30° C. or less. That is, a difference between the maximum temperature and the minimum temperature among the finishing temperature of the finishing-milling may be 30° C. or less. By controlling the deviation of the finishing temperatures (FDT) of the finishing-milling as described above, it is possible to control the area fractions of fine grains and coarse grains after the final annealing. As a result, excellent magnetism may be obtained without the hot-rolled sheet annealing. Specifically, the deviation of the finishing temperatures (FDT) of the finishing-milling in an entire length of the hot-rolled sheet may be 15 to 30° C.

In addition, by properly controlling a temperature of the winding, it may contribute to the control of the area fractions of fine grains and coarse grains after the final annealing. Specifically, a temperature (CT) in the winding may satisfy the following formula.

$$0.55 \le CT \times [\text{Si}]/1000 \le 1.75$$

Herein, CT represents a temperature (° C.) in the winding, and [Si] represents a content (wt %) of Si.

The microstructure of the hot-rolled sheet is improved by controlling the finishing temperature of the finishing-milling and the temperature of the winding, which are described above. In the embodiment of the present invention, since the hot-rolled sheet annealing process is not performed, the microstructure of the hot-rolled sheet has a great influence on the microstructure of the non-oriented electrical steel sheet that is finally manufactured.

Specifically, the microstructure of the hot-rolled sheet may satisfy the following formula.

$$GS_{center}/GS_{surface} \ge 1.15$$

Herein, $GS_{center}$ represents an average grain diameter of (¼)t to (¾)t portions in a thickness direction, and $GS_{surface}$ represents an average grain diameter from a surface to a (¼)t portion.

As described above, by increasing the grain diameter at a center of the hot-rolled sheet, it may contribute to the control of the area fractions of fine grains and coarse grains after the final annealing.

The (¼)t to (¾)t portions mean thickness portions that are (¼)t to (¾)t with respect to an entire thickness (t) of the hot-rolled sheet.

In addition, the microstructure of the hot-rolled sheet may satisfy the following formula.

$$(GS_{center} \times \text{recrystallization rate})/10 \ge 2$$

Herein, $GS_{center}$ represents an average grain diameter of the (¼)t to (¾)t portions in a thickness direction, and the recrystallization rate represents an area fraction of the grain recrystallized after the hot-rolling.

In the embodiment of the present invention, a component system is designed to cause phase transformation, and recrystallization through the phase transformation occurs by controlling the hot-rolling temperature condition, so that a recrystallization structure may be secured after the hot-rolling. In this case, the higher the recrystallization rate, the better the structure property of the final manufactured non-oriented electrical steel sheet, thereby improving the magnetism. In the embodiment of the present invention, since the hot-rolled sheet annealing process is not performed, the recrystallization rate in the hot-rolling is important.

Recrystallized grains and non-recrystallized grains may be distinguished by presence/absence of a deformed structure, and the presence/absence of the deformed structure may be distinguished by observing the microstructure thereof through an optical microscope.

Next, without the hot-rolled sheet annealing, the hot-rolled sheet is cold-rolled to manufacture a cold-rolled sheet. As described above, in the embodiment of the present invention, it is possible to manufacture a non-oriented electrical steel sheet having excellent magnetism through the alloy composition and various process control even if the hot-rolled sheet annealing is not performed.

The cold-rolling is finally performed to a thickness of 0.10 mm to 0.70 mm. As necessary, the second cold-rolling after the first cold-rolling and the intermediate annealing may be performed, and the final rolling reduction may be in a range of 50 to 95%.

Next, the cold-rolled sheet is finally annealed. In the process of annealing the cold-rolled sheet, the annealing temperature is not largely limited as long as it is a temperature generally applied to the non-oriented electrical steel sheet. Since the iron loss of the non-oriented electrical steel sheet is closely related to the grain diameter, it is suitable when it is 900 to 1100° C. When the temperature is too low, the hysteresis loss increases because the grains are too fine, and when the temperature is too high, the grains are too coarse and thus the eddy current loss increases, so that the iron loss is deteriorated.

In the embodiment of the present invention, during the final annealing, Si and Al components, and a hydrogen atmosphere ($H_2$) in an annealing furnace may satisfy $10 \times ([\text{Si}]+1000 \times [\text{Al}])-[H_2] \le 90$. By performing the annealing in the above-described hydrogen atmosphere, a concentration layer including a Si oxide is formed to an appropriate depth, and it is possible to allow Al to not be included in the concentration layer. This concentration layer may contribute to the improvement of magnetism.

After the final-annealing, an insulating film may be formed. The insulating film may be formed as an organic, inorganic, and organic/inorganic composite film, and it may be formed with other insulating coating materials.

Hereinafter, the present invention will be described in more detail through examples. However, the examples are only for illustrating the present invention, and the present invention is not limited thereto.

Example 1

A slab including the alloy compositions and the balance of Fe and inevitable impurities summarized in Table 1 below were manufactured. The slab was heated at 1150° C., hot-rolled to a thickness of 2.5 mm, and then wound. The wound hot-rolled steel sheet was pickled without the hot-rolled sheet annealing, then cold-rolled to a thickness of 0.50 mm, and finally subjected to cold-rolled sheet annealing. In this case, the atmosphere during the cold-rolled sheet annealing was controlled to satisfy the relational formula of $10\times([Si]+1000\times[A1])-[H_2]\leq 90$, and it was performed at the annealing temperature between 90° and 950° C.

For each specimen, after the final annealing, the distribution of inclusions was measured, and the iron loss ($W_{15/50}$) and magnetic flux density ($B_{50}$) were also measured, and the results are shown in Table 2 below.

The iron loss ($W_{15/50}$) is average loss (W/kg) of the rolling direction and the transverse direction when the magnetic flux density of 1.5 Tesla is induced at a frequency of 50 Hz.

The magnetic flux density ($B_{50}$) is a magnetic flux density (Tesla) induced when a magnetic field of 5000 A/m is added.

As a measurement method of $MnS_{SRT}/MnS_{Max}$, $MnS_{SRT}$ was measured as a fraction that could be reached under the condition of being maintained at the reheating temperature (SRT) for 1 hour or more, and was calculated by using a commercial thermodynamic program.

TABLE 1

| Steel type | C | Si | Mn | S | Al | N | Ti | Cu |
|---|---|---|---|---|---|---|---|---|
| A1 | 0.0009 | 0.72 | 0.4 | 0.0025 | 0.0052 | 0.0028 | 0.0035 | 0.019 |
| A2 | 0.0031 | 0.93 | 0.41 | 0.0032 | 0.0071 | 0.0036 | 0.0017 | 0.005 |
| A3 | 0.0015 | 1.23 | 0.44 | 0.0027 | 0.0009 | 0.0013 | 0.0031 | 0.002 |
| A4 | 0.0014 | 0.68 | 0.55 | 0.0026 | 0.0048 | 0.0036 | 0.0012 | 0.016 |
| A5 | 0.0021 | 0.96 | 0.22 | 0.0022 | 0.0014 | 0.003 | 0.0013 | 0.008 |
| A6 | 0.0027 | 1.38 | 0.52 | 0.0011 | 0.0014 | 0.0007 | 0.0021 | 0.01 |
| A7 | 0.0009 | 1.68 | 0.86 | 0.0007 | 0.008 | 0.0042 | 0.0008 | 0.015 |
| A8 | 0.0037 | 1.55 | 0.82 | 0.0043 | 0.014 | 0.0012 | 0.0009 | 0.007 |
| A9 | 0.0039 | 1.67 | 0.53 | 0.0008 | 0.0088 | 0.0009 | 0.0032 | 0.01 |
| A10 | 0.0015 | 1.95 | 0.64 | 0.0015 | 0.0028 | 0.0022 | 0.0014 | 0.016 |
| A11 | 0.0011 | 2.28 | 1.1 | 0.0017 | 0.0012 | 0.0009 | 0.0043 | 0.007 |
| A12 | 0.0011 | 2.36 | 0.93 | 0.0032 | 0.0033 | 0.0025 | 0.0036 | 0.013 |
| A13 | 0.0036 | 1.69 | 0.75 | 0.0038 | 0.016 | 0.0022 | 0.0012 | 0.004 |

TABLE 2

| Steel type | [Mn]/([Si] + 150 × [Al]) | $MnS_{SRT}/MnS_{Max}$ | $F_{count}$ | $F_{area}$ | $F_{count} \times F_{area}$ | {111} Grain fraction (volume %) | Iron loss, $W_{15/50}$ (W/Kg) | Magnetic flux density, $B_{50}$ (T) | Remarks |
|---|---|---|---|---|---|---|---|---|---|
| A1 | 0.267 | 0.753 | 0.33 | 0.65 | 0.21 | 30.3 | 3.45 | 1.75 | Inventive example |
| A2 | 0.206 | 0.818 | 0.31 | 0.73 | 0.23 | 31.6 | 3.32 | 1.74 | Inventive example |
| A3 | 0.322 | 0.81 | 0.27 | 0.72 | 0.19 | 28.4 | 3.25 | 1.74 | Inventive example |
| A4 | 0.393 | 0.829 | 0.25 | 0.65 | 0.16 | 45.1 | 4.53 | 1.69 | Comparative example |
| A5 | 0.188 | 0.358 | 0.11 | 0.34 | 0.04 | 44.0 | 4.26 | 1.69 | Comparative example |
| A6 | 0.327 | 0.622 | 0.24 | 0.79 | 0.19 | 28.2 | 3.16 | 1.73 | Inventive example |
| A7 | 0.299 | 0.677 | 0.31 | 0.69 | 0.21 | 29.7 | 3.02 | 1.72 | Inventive example |
| A8 | 0.225 | 0.943 | 0.32 | 0.68 | 0.22 | 39.6 | 4.15 | 1.66 | Comparative example |
| A9 | 0.177 | 0.52 | 0.16 | 0.44 | 0.07 | 43.7 | 4.08 | 1.66 | Comparative example |
| A10 | 0.27 | 0.802 | 0.32 | 0.59 | 0.19 | 30.5 | 2.91 | 1.73 | Inventive example |
| A11 | 0.447 | 0.912 | 0.18 | 0.56 | 0.1 | 42.6 | 3.79 | 1.66 | Comparative example |
| A12 | 0.326 | 0.944 | 0.26 | 0.63 | 0.16 | 31.4 | 2.65 | 1.72 | Inventive example |
| A13 | 0.183 | 0.931 | 0.22 | 0.75 | 0.17 | 44.5 | 3.85 | 1.67 | Comparative example |

As shown in Table 1 and Table 2, it can be confirmed that in A1, A2, A3, A6, A7, A10, and A12, which satisfy all of the alloy components and manufacturing process proposed in the embodiment of the present invention, sulfides of (Mn, Cu)S are properly precipitated, and they provide excellent magnetism.

On the other hand, it can be confirmed that A4 does not satisfy the value of Formula 1, so magnetism is deteriorated.

A5 did not satisfy the content of Mn and the value of Formula 1, and during the heating of the slab, $MnS_{SRT}/MnS_{Max}\geq0.6$ or more was not satisfied. As a result, it can be confirmed that the sulfide is not properly precipitated, and the magnetism is deteriorated.

it can be confirmed that A8 does not satisfy the amount of Al component added, and as a result, the magnetism is deteriorated.

A5 did not satisfy the value of Formula 1, and during the heating of the slab, $MnS_{SRT}/MnS_{Max}\geq0.6$ or more was not satisfied. As a result, it can be confirmed that the sulfide is not properly precipitated, and the magnetism is deteriorated.

A11 did not satisfy the content of Mn and Formula 1. As a result, it can be confirmed that the sulfide is not properly precipitated, and the magnetism is deteriorated.

A13 did not satisfy the content of A1 and Formula 1. As a result, it can be confirmed that the magnetism is deteriorated.

Example 2

A slab including the alloy compositions and the balance of Fe and inevitable impurities summarized in Table 3 below was manufactured. The slab was heated at 1100 to 1250° C., hot-rolled to a thickness of 2.5 mm, and then wound. During the heating of the slab, the maintaining time in the austenite single phase was changed as shown in Table 4 below, and the effect of the maintaining time was also reported. The wound hot-rolled steel sheet was pickled without the hot-rolled sheet annealing, then cold-rolled to a thickness of 0.50 mm, and finally subjected to cold-rolled sheet annealing. In this case, it was annealed in an atmosphere that satisfies the relational formula of $10\times([Si]+1000\times[Al])-[H_2]\leq90$, and the temperature therefor was between 900 and 950° C.

For each specimen, after the final annealing, the number and distribution of inclusions was measured, and the iron loss (W15/50) and magnetic flux density (B50) were also measured, and the results are shown in Table 5 below.

TABLE 3

| Steel type | C | Si | Mn | P | S | Al | N | Ti | Sn | Cu |
|---|---|---|---|---|---|---|---|---|---|---|
| B1 | 0.0029 | 1.27 | 0.59 | 0.07 | 0.0039 | 0.0032 | 0.0009 | 0.0005 | 0.06 | 0.003 |
| B2 | 0.0023 | 0.76 | 0.46 | 0.04 | 0.0018 | 0.0074 | 0.0038 | 0.0032 | 0.05 | 0.013 |
| B3 | 0.0039 | 0.86 | 0.41 | 0.03 | 0.004 | 0.008 | 0.0018 | 0.0029 | 0.03 | 0.008 |
| B4 | 0.0008 | 0.97 | 0.46 | 0 | 0.0012 | 0.0024 | 0.0027 | 0.0011 | 0.05 | 0.013 |
| B5 | 0.0032 | 0.92 | 0.51 | 0 | 0.0039 | 0.0019 | 0.0035 | 0.0027 | 0 | 0.007 |
| B6 | 0.0016 | 1.1 | 0.52 | 0.1 | 0.0022 | 0.0041 | 0.004 | 0.0035 | 0.05 | 0.015 |
| B7 | 0.0009 | 1.65 | 0.55 | 0.03 | 0.0024 | 0.0068 | 0.0022 | 0.0018 | 0.02 | 0.017 |
| B8 | 0.0027 | 1.99 | 0.68 | 0.04 | 0.0017 | 0.002 | 0.0025 | 0.0015 | 0.1 | 0.018 |
| B9 | 0.0021 | 1.67 | 0.68 | 0.08 | 0.003 | 0.0087 | 0.0009 | 0.0026 | 0 | 0.009 |
| B10 | 0.0042 | 2.01 | 0.63 | 0.01 | 0.0019 | 0.0074 | 0.0031 | 0.0036 | 0.04 | 0.017 |
| B11 | 0.0039 | 2.29 | 0.82 | 0 | 0.0033 | 0.0018 | 0.0025 | 0.0029 | 0.03 | 0.016 |
| B12 | 0.0007 | 2.23 | 0.93 | 0 | 0.0023 | 0.0037 | 0.0023 | 0.0006 | 0 | 0.01 |
| B13 | 0.0024 | 2.34 | 0.94 | 0.04 | 0.001 | 0.0043 | 0.0029 | 0.0018 | 0.06 | 0.012 |
| B14 | 0.0031 | 2.4 | 0.87 | 0.05 | 0.0009 | 0.0096 | 0.0009 | 0.0005 | 0.03 | 0.02 |

TABLE 4

| Steel type | [Mn]/ ([Si] + 150 × [Al]) | SRT (° C.) | $MnS_{SRT}/MnS_{Max}$ | SRT-A1 (° C.) | γ Fraction | γ single phase maintaining time (T) |
|---|---|---|---|---|---|---|
| B1 | 0.337 | 1200 | 0.824 | 282 | 100 | 1.6 |
| B2 | 0.246 | 1180 | 0.578 | 286 | 100 | 2.3 |
| B3 | 0.199 | 1180 | 0.786 | 277 | 100 | 1.5 |
| B4 | 0.346 | 1140 | 0.629 | 241 | 100 | 1.2 |
| B5 | 0.423 | 1250 | 0.59 | 358 | 100 | 1.3 |
| B6 | 0.303 | 1220 | 0.541 | 301 | 100 | 0.9 |
| B7 | 0.206 | 1180 | 0.773 | 232 | 100 | 2 |
| B8 | 0.297 | 1180 | 0.763 | 218 | 100 | 2.1 |
| B9 | 0.229 | 1220 | 0.768 | 276 | 100 | 0.7 |
| B10 | 0.202 | 1110 | 0.911 | 144 | 100 | 1.4 |
| B11 | 0.32 | 1100 | 0.969 | 138 | 100 | 0.8 |
| B12 | 0.334 | 1160 | 0.908 | 218 | 100 | 1.3 |
| B13 | 0.315 | 1150 | 0.827 | 189 | 100 | 1.8 |
| B14 | 0.227 | 1190 | 0.743 | 205 | 78.5 | 1.1 |

TABLE 5

| Steel type | $F_{count}$ | $F_{area}$ | $F_{count} \times F_{area}$ | {111} grain fraction (volume %) | Iron loss, $W_{15/50}$ (W/Kg) | Magnetic flux density, $B_{50}$ (T) | Remarks |
|---|---|---|---|---|---|---|---|
| B1 | 0.38 | 0.53 | 0.2 | 32.4 | 3.13 | 1.74 | Inventive example |
| B2 | 0.18 | 0.48 | 0.09 | 42.0 | 4.49 | 1.69 | Comparative example |

TABLE 5-continued

| Steel type | $F_{count}$ | $F_{area}$ | $F_{count} \times F_{area}$ | {111} grain fraction (volume %) | Iron loss, $W_{15/50}$ (W/Kg) | Magnetic flux density, $B_{50}$ (T) | Remarks |
|---|---|---|---|---|---|---|---|
| B3 | 0.35 | 0.69 | 0.24 | 29.5 | 3.29 | 1.75 | Inventive example |
| B4 | 0.3 | 0.62 | 0.19 | 31.2 | 3.15 | 1.75 | Inventive example |
| B5 | 0.1 | 0.42 | 0.04 | 44.9 | 4.36 | 1.69 | Comparative example |
| B6 | 0.1 | 0.31 | 0.03 | 41.7 | 4.23 | 1.68 | Comparative example |
| B7 | 0.27 | 0.71 | 0.19 | 30.8 | 2.96 | 1.74 | Inventive example |
| B8 | 0.29 | 0.61 | 0.18 | 30.1 | 2.85 | 1.73 | Inventive example |
| B9 | 0.12 | 0.47 | 0.06 | 45.7 | 3.88 | 1.66 | Comparative example |
| B10 | 0.34 | 0.52 | 0.18 | 43.8 | 3.82 | 1.66 | Comparative example |
| B11 | 0.13 | 0.41 | 0.05 | 40.6 | 3.77 | 1.66 | Comparative example |
| B12 | 0.32 | 0.54 | 0.17 | 33.1 | 2.76 | 1.73 | Inventive example |
| B13 | 0.32 | 0.69 | 0.22 | 31.8 | 2.72 | 1.72 | Inventive example |
| B14 | 0.27 | 0.59 | 0.16 | 52.5 | 3.74 | 1.65 | Comparative example |

As shown in Table 3 to Table 5, it can be confirmed that in B1, B3, B4, B7, B8, B12, and B13, which satisfy all of the alloy components and manufacturing process proposed in the embodiment of the present invention, sulfides of (Mn, Cu)S are properly precipitated, and they provide excellent magnetism.

On the other hand, during the heating of the slab, B2 did not satisfy $MnS_{SRT}/MnS_{Max} \geq 0.6$. As a result, it can be confirmed that the sulfide is not properly precipitated, and the magnetism is deteriorated.

B5 did not satisfy Formula 1 and $MnS_{SRT}/MnS_{Max} \geq 0.6$. As a result, it can be confirmed that the sulfide is not properly precipitated, and the magnetism is deteriorated.

During the heating of the slab, B6 did not satisfy $MnS_{SRT}/MnS_{Max} \geq 0.6$ and the austenite single phase maintaining time. As a result, it can be confirmed that the sulfide is not properly precipitated, and the magnetism is deteriorated.

B9 did not satisfy the austenite single phase maintaining time during the heating of the slab. As a result, it can be confirmed that the sulfide is not properly precipitated, and the magnetism is deteriorated.

B10 had a low slab heating temperature. As a result, it can be confirmed that the sulfide is not properly precipitated, and the magnetism is deteriorated.

B11 had a low slab heating temperature and did not satisfy the austenite single phase maintaining time. As a result, it can be confirmed that the sulfide is not properly precipitated, and the magnetism is deteriorated.

B14 had poor magnetism as it was heat-treated in an austenite (γ)/ferrite (α) region or more rather than in an austenite single phase (γ) region during the heating of the slab.

Example 3

A slab including, in wt %, C at 0.0023%, Si at 2%, Mn at 0.7%, P at 0.02%, S at 0.0017%, Al at 0.009%, N at 0.002%, Ti at 0.001%, Sn at 0.01%, Cu at 0.01%, and the balance of Fe and other impurities was manufactured. The slab was heated at 1180° C., hot-rolled to a thickness of 2.6 mm, and then wound. After being pickled and cold-rolled, the wound hot-rolled steel sheet was pickled without the hot-rolled sheet annealing, then cold-rolled to a thickness of 0.50 mm, and finally subjected to cold-rolled sheet annealing. The cold-rolled sheet annealing temperature was 900 to 950° C., and in this case, by changing the hydrogen atmosphere in the annealing furnace, the influence of the relational formula of $10\times([Si]+1000\times[Al])-[H_2]\leq 90$ on the formation of the surface oxide layer and on the magnetism was observed.

The thickness of the Al oxide layer represents a thickness of a region of the surface in which Al and O are the main components, and the thickness of the Si concentration layer represents a thickness of a region of the surface in which Si is 3 wt % or more.

TABLE 6

| $H_2$ (volume %) | $10 \times ([Si] + 1000 \times [Al]) - [H_2]$ | Al Oxide layer thickness (μm) | Si concentration layer thickness (μm) | {111} grain fraction (volume %) | Iron loss, $W_{15/50}$ (W/Kg) | Magnetic flux density, $B_{50}$ (T) | Remarks |
|---|---|---|---|---|---|---|---|
| 0 | 110 | 0.06 | 0 | 39.6 | 3.87 | 1.69 | Comparative example |
| 10 | 100 | 0.04 | 0 | 38.1 | 3.62 | 1.68 | Comparative example |
| 20 | 90 | 0 | 0.12 | 28.7 | 2.98 | 1.73 | Inventive example |
| 30 | 80 | 0 | 0.08 | 31.9 | 3.01 | 1.74 | Inventive example |
| 40 | 70 | 0 | 0.05 | 30.6 | 2.86 | 1.73 | Inventive example |

TABLE 6-continued

| $H_2$ (volume %) | 10 × ([Si] + 1000 × [Al]) − [$H_2$] | Al Oxide layer thickness (μm) | Si concentration layer thickness (μm) | {111} grain fraction (volume %) | Iron loss, $W_{15/50}$ (W/Kg) | Magnetic flux density, $B_{50}$ (T) | Remarks |
|---|---|---|---|---|---|---|---|
| 50 | 60 | 0 | 0.03 | 30.9 | 2.82 | 1.73 | Inventive example |

As shown in Table 6, it can be confirmed that in the inventive example in which the hydrogen atmosphere of the final annealing was properly controlled, Al was not concentrated on the surface thereof, the Si concentration layer was formed in an appropriate thickness, and the magnetism was excellent. On the other hand, it can be confirmed that in the comparative example in which the hydrogen atmosphere of the final annealing was not properly controlled, Al, not Si, was concentrated on the surface thereof, and the magnetism was deteriorated.

Example 4

A slab including, in wt %, C at 0.0023%, Si at 2%, Mn at 0.7%, P at 0.02%, S at 0.0017%, N at 0.002%, Ti at 0.001%, Sn at 0.01%, Cu at 0.01%, the content of Al in Table 5, and the balance of Fe and other impurities was manufactured. The slab was reheated at 1180° C., then hot-rolled to a thickness of 2.6 mm, and then wound. After being pickled and cold-rolled, the wound hot-rolled steel sheet was pickled without the hot-rolled sheet annealing, then cold-rolled to a thickness of 0.50 mm, and finally subjected to cold-rolled sheet annealing. The cold-rolled sheet annealing temperature was 900 to 950° C., and in this case, by changing the hydrogen atmosphere in the annealing furnace, the influence of the relational formula of $10\times([Si]+1000\times[Al])-[H_2]\leq 90$ according to the change in the amount of Al added, on the formation of the surface oxide layer and on the magnetism was observed.

For each specimen, after the final annealing, the oxide layer and the thickness thereof were measured by using an SEM and a TEM, and the iron loss (W15/50) and magnetic flux density (B50) were also measured, and the results are shown in Table 7 below.

TABLE 7

| Al | $H_2$ (volume %) | [Mn]/ ([Si] + 150 × [Al]) | 10 × ([Si] + 1000 × [Al]) − [$H_2$] | Al oxide layer thickness (μm) | Si concentration layer thickness (μm) | {111} grain fraction (volume %) | Iron loss, $W_{15/50}$ (W/Kg) | Magnetic flux density, $B_{50}$ (T) | Remarks |
|---|---|---|---|---|---|---|---|---|---|
| 0.003 | 20 | 0.286 | 30 | 0 | 0.07 | 33.6 | 2.93 | 1.73 | Inventive example |
| 0.006 | 20 | 0.241 | 60 | 0 | 0.09 | 30.4 | 3.05 | 1.74 | Inventive example |
| 0.009 | 20 | 0.209 | 90 | 0 | 0.09 | 32.5 | 3.08 | 1.73 | Inventive example |
| 0.01 | 20 | 0.2 | 100 | 0 | 0.16 | 43.1 | 3.58 | 1.69 | Comparative example |
| 0.012 | 20 | 0.184 | 120 | 0.07 | 0 | 42.1 | 3.67 | 1.69 | Comparative example |
| 0.003 | 30 | 0.286 | 20 | 0 | 0.08 | 27.6 | 2.96 | 1.74 | Inventive example |
| 0.006 | 30 | 0.241 | 50 | 0 | 0.07 | 31.5 | 2.88 | 1.74 | Inventive example |
| 0.009 | 30 | 0.209 | 80 | 0 | 0.1 | 33.3 | 2.95 | 1.73 | Inventive example |
| 0.01 | 30 | 0.2 | 90 | 0 | 0.12 | 31.2 | 3.03 | 1.73 | Inventive example |
| 0.012 | 30 | 0.184 | 110 | 0.05 | 0 | 42.7 | 3.55 | 1.7 | Comparative example |
| 0.015 | 30 | 0.165 | 140 | 0.11 | 0 | 41.9 | 3.81 | 1.69 | Comparative example |
| 0.02 | 30 | 0.14 | 190 | 0.15 | 0 | 45.5 | 3.86 | 1.69 | Comparative example |

As shown in Table 7, it can be confirmed that in the inventive example that satisfies all of the alloy components and the final annealing atmosphere proposed in the embodiment of the present invention, Al was not concentrated on the surface thereof, and the Si concentration layer was formed with an appropriate thickness and had excellent magnetism.

On the other hand, it can be confirmed that in the comparative example in which the alloy composition was not satisfied or the final annealing atmosphere was not controlled, Al, not Si, was concentrated on the surface thereof, or the thickness of the Si concentration layer was increased, thus the magnetism was deteriorated.

Example 5

A slab including the alloy compositions and the balance of Fe and inevitable impurities summarized in Table 8 below were manufactured. The slab was heated at 1150° C., hot-rolled to a thickness of 2.6 mm, and then wound. The influence of the FET was observed by changing the FET temperature at the finishing milling inlet as shown in Table 9, and the hot-rolling was performed at 87% of the reduction ratio of the finishing milling, and the front stage reduction rate among the finishing milling was 73%. After the hot-rolling, the wound hot-rolled steel sheet was pickled without the hot-rolled sheet annealing, then cold-rolled to a thickness of 0.50 mm, and finally subjected to cold-rolled sheet annealing. In this case, the annealing temperature of the cold-rolled sheet was between 900 to 950° C.

In order to obtain Intensity(max, HBA), the same alloy composition and the hot-rolled sheet annealing process of the processes were added to measure the Intensity(max, HBA).

After the final annealing, the texture was measured by using an EBSD, and the iron loss (W15/50) and magnetic flux density (B50) were also measured, and the results are shown in Table 10 below.

TABLE 8

| Steel type | C | Si | Mn | S | Al | N | Ti | Cu |
|---|---|---|---|---|---|---|---|---|
| C1 | 0.0014 | 0.68 | 0.55 | 0.0026 | 0.0048 | 0.0036 | 0.0012 | 0.016 |
| C2 | 0.0009 | 0.72 | 0.4 | 0.0025 | 0.0052 | 0.0028 | 0.0035 | 0.019 |
| C3 | 0.0021 | 0.96 | 0.22 | 0.0022 | 0.0014 | 0.003 | 0.0013 | 0.008 |
| C4 | 0.0027 | 1.38 | 0.52 | 0.0011 | 0.0014 | 0.0007 | 0.0021 | 0.01 |
| C5 | 0.0009 | 1.68 | 0.86 | 0.0007 | 0.008 | 0.0042 | 0.0008 | 0.015 |
| C6 | 0.0026 | 1.75 | 0.68 | 0.0053 | 0.0052 | 0.0032 | 0.0022 | 0.014 |
| C7 | 0.0037 | 1.55 | 0.82 | 0.0043 | 0.014 | 0.0012 | 0.0009 | 0.007 |
| C8 | 0.0031 | 0.93 | 0.41 | 0.0032 | 0.0071 | 0.0036 | 0.0017 | 0.005 |
| C9 | 0.0015 | 1.23 | 0.44 | 0.0027 | 0.0009 | 0.0013 | 0.0031 | 0.002 |
| C10 | 0.0039 | 1.67 | 0.53 | 0.0008 | 0.0088 | 0.0009 | 0.0032 | 0.01 |
| C11 | 0.0015 | 1.95 | 0.64 | 0.0015 | 0.0028 | 0.0022 | 0.0014 | 0.016 |
| C12 | 0.0011 | 2.28 | 1.1 | 0.0017 | 0.0012 | 0.0009 | 0.0043 | 0.007 |
| C13 | 0.0011 | 2.36 | 0.93 | 0.0032 | 0.0033 | 0.0025 | 0.0036 | 0.013 |
| C14 | 0.0043 | 1.21 | 0.53 | 0.0027 | 0.007 | 0.0021 | 0.0036 | 0.01 |

TABLE 9

| Steel type | [Mn]/([Si] + 150 × [Al]) | Ae1 (° C.) | (2Ae3 + Ae1)/3(° C.) | FET (° C.) |
|---|---|---|---|---|
| C1 | 0.393 | 889 | 917 | 950 |
| C2 | 0.267 | 910 | 933 | 920 |
| C3 | 0.188 | 930 | 962 | 950 |
| C4 | 0.327 | 927 | 971 | 960 |
| C5 | 0.299 | 924 | 973 | 950 |
| C6 | 0.269 | 945 | 998 | 1020 |
| C7 | 0.225 | 900 | 959 | 950 |
| C8 | 0.206 | 900 | 940 | 920 |
| C9 | 0.322 | 936 | 969 | 960 |
| C10 | 0.177 | 937 | 999 | 930 |
| C11 | 0.27 | 972 | 1029 | 1000 |
| C12 | 0.447 | 949 | 1016 | 1020 |
| C13 | 0.326 | 978 | 1053 | 1010 |
| C14 | 0.235 | 921 | 959 | 1000 |

TABLE 10

| Steel type | (Vcube + Vgoss + Vr-cube)/ Intensity(max) | Intensity (max, HB)/ Intensity (max, HBA) | {111} grain fraction (volume %) | Iron loss, $W_{15/50}$ (W/Kg) | Magnetic flux density, $B_{50}$ (T) | Remarks |
|---|---|---|---|---|---|---|
| C1 | 0.58 | 1.71 | 46.9 | 4.55 | 1.68 | Comparative example |
| C2 | 2.26 | 1.48 | 31.9 | 3.41 | 1.75 | Inventive example |
| C3 | 0.75 | 1.6 | 49.9 | 4.12 | 1.69 | Comparative example |
| C4 | 1.59 | 1.35 | 33.3 | 3.09 | 1.73 | Inventive example |
| C5 | 1.3 | 1.32 | 30.3 | 2.96 | 1.73 | Inventive example |
| C6 | 0.82 | 1.68 | 47.5 | 3.75 | 1.68 | Comparative example |
| C7 | 1.24 | 1.7 | 48.6 | 4.06 | 1.67 | Comparative example |
| C8 | 2.3 | 1.27 | 30.7 | 3.25 | 1.74 | Inventive example |
| C9 | 1.03 | 1.44 | 28.4 | 3.27 | 1.73 | Inventive example |
| C10 | 0.6 | 1.93 | 46.9 | 4.01 | 1.67 | Comparative example |

TABLE 10-continued

| Steel type | (Vcube + Vgoss + Vr-cube)/ Intensity(max) | Intensity (max, HB)/ Intensity (max, HBA) | {111} grain fraction (volume %) | Iron loss, $W_{15/50}$ (W/Kg) | Magnetic flux density, $B_{50}$ (T) | Remarks |
|---|---|---|---|---|---|---|
| C11 | 2.28 | 1.2 | 32.1 | 2.93 | 1.72 | Inventive example |
| C12 | 0.57 | 1.83 | 41.5 | 3.89 | 1.66 | Comparative example |
| C13 | 1.75 | 1.43 | 28.3 | 2.68 | 1.71 | Inventive example |
| C14 | 0.66 | 1.82 | 45.1 | 4.26 | 1.67 | Comparative example |

As shown in Table 8 to Table 10, it can be seen that in C2, C4, C5, C8, C9, C11, and C13 satisfying all of the alloy components and the finishing-milling start temperature proposed in the embodiment of the present invention, the texture was properly formed after the final annealing, and Intensity(max, HB)/Intensity(max, HBA) was also formed small.

On the other hand, C1 did not satisfy Formula 1, and the finishing-milling start temperature was not properly controlled therein. Therefore, the texture was not properly formed, and the value of Intensity(max, HB)/Intensity(max, HBA) was also large. As a result, the magnetism was deteriorated.

C3 did not satisfy the content of Mn and Formula 1. Therefore, the texture was not properly formed, and the value of Intensity(max, HB)/Intensity(max, HBA) was also large. As a result, the magnetism was deteriorated.

In C6, the content of S and the finishing-milling start temperature were also not properly controlled therein. Therefore, the texture was not properly formed, and the value of Intensity(max, HB)/Intensity(max, HBA) was also large. As a result, the magnetism was deteriorated.

C7 did not satisfy the content of Al. Therefore, the value of Intensity(max, HB)/Intensity(max, HBA) was large. As a result, the magnetism was deteriorated.

C10 did not satisfy Formula 1, and the finishing-milling start temperature was not properly controlled therein. Therefore, the texture was not properly formed, and the value of Intensity(max, HB)/Intensity(max, HBA) was also large. As a result, the magnetism was deteriorated.

C10 did not satisfy the content of Mn and Formula 1, and the finishing-milling start temperature was not properly controlled therein. Therefore, the texture was not properly formed, and the value of Intensity(max, HB)/Intensity(max, HBA) was also large. As a result, the magnetism was deteriorated.

In C14, the finishing-milling start temperature was also not properly controlled. Therefore, the texture was not properly formed, and the value of Intensity(max, HB)/Intensity(max, HBA) was also large. As a result, the magnetism was deteriorated.

Example 6

A slab including the alloy compositions and the balance of Fe and inevitable impurities summarized in Table 11 below was manufactured. The slab was heated at 1100 to 1250° C., hot-rolled to a thickness of 2.5 mm, and then wound. The finishing-milling start temperature FET for each steel type was changed as shown in Table 12 below, and while changing the reduction ratio of the finishing-milling and the front stage reduction ratio of the finishing-milling as shown in Table 12 below, the hot-rolling was performed. After the hot-rolling, the wound hot-rolled steel sheet was pickled without the hot-rolled sheet annealing, then cold-rolled to a thickness of 0.50 mm, and finally subjected to cold-rolled sheet annealing. In this case, the annealing temperature of the cold-rolled sheet was between 900 to 950° C.

In order to obtain Intensity(max, HBA), the same alloy composition and the hot-rolled sheet annealing process of the processes were added to measure the Intensity(max, HBA).

After the final annealing, the texture was measured by using an EBSD, and the iron loss (W15/50) and magnetic flux density (B50) were also measured, and the results are shown in Table 13 below.

TABLE 11

| Steel type | C | Si | Mn | P | S | Al | N | Ti | Sn | Cu |
|---|---|---|---|---|---|---|---|---|---|---|
| D1 | 0.0008 | 0.97 | 0.46 | 0 | 0.0012 | 0.0024 | 0.0027 | 0.0011 | 0.05 | 0.013 |
| D2 | 0.0029 | 1.27 | 0.59 | 0.07 | 0.0039 | 0.0032 | 0.0009 | 0.0005 | 0.06 | 0.003 |
| D3 | 0.0042 | 2.01 | 0.63 | 0.01 | 0.0019 | 0.0074 | 0.0031 | 0.0036 | 0.04 | 0.017 |
| D4 | 0.0039 | 2.29 | 0.82 | 0 | 0.0033 | 0.0018 | 0.0025 | 0.0029 | 0.03 | 0.016 |
| D5 | 0.0039 | 0.86 | 0.41 | 0.03 | 0.004 | 0.008 | 0.0018 | 0.0029 | 0.03 | 0.008 |
| D6 | 0.0016 | 1.1 | 0.52 | 0.1 | 0.0022 | 0.0041 | 0.004 | 0.0035 | 0.05 | 0.015 |
| D7 | 0.0009 | 1.65 | 0.55 | 0.03 | 0.0024 | 0.0068 | 0.0022 | 0.0018 | 0.02 | 0.017 |
| D8 | 0.0032 | 0.92 | 0.51 | 0 | 0.0039 | 0.0019 | 0.0035 | 0.0027 | 0 | 0.007 |
| D9 | 0.0027 | 1.99 | 0.68 | 0.04 | 0.0017 | 0.002 | 0.0025 | 0.0015 | 0.1 | 0.018 |
| D10 | 0.0021 | 1.67 | 0.68 | 0.08 | 0.003 | 0.0087 | 0.0009 | 0.0026 | 0 | 0.009 |
| D11 | 0.0007 | 2.23 | 0.93 | 0 | 0.0023 | 0.0037 | 0.0023 | 0.0006 | 0 | 0.01 |
| D12 | 0.0023 | 0.76 | 0.46 | 0.04 | 0.0018 | 0.0074 | 0.0038 | 0.0032 | 0.05 | 0.013 |
| D13 | 0.0024 | 2.34 | 0.94 | 0.04 | 0.001 | 0.0043 | 0.0029 | 0.0018 | 0.06 | 0.012 |
| D14 | 0.0031 | 2.4 | 0.87 | 0.05 | 0.0009 | 0.0096 | 0.0009 | 0.0005 | 0.03 | 0.02 |

TABLE 12

| Steel type | [Mn]/([Si] + 150 × [Al]) | Ae1 (° C.) | (2Ae3 + Ae1)/3 (° C.) | FET (° C.) | Finishing-milling reduction ratio (%) | Finishing-milling shear reduction ratio (%) |
|---|---|---|---|---|---|---|
| D1 | 0.346 | 899 | 940 | 940 | 85.6 | 73.6 |
| D2 | 0.337 | 918 | 986 | 970 | 87.9 | 78.2 |
| D3 | 0.202 | 966 | 1042 | 960 | 76.8 | 54.6 |
| D4 | 0.32 | 962 | 1049 | 970 | 87.7 | 63.6 |
| D5 | 0.199 | 903 | 949 | 940 | 89 | 87.8 |
| D6 | 0.303 | 919 | 992 | 1000 | 81.5 | 70.6 |
| D7 | 0.206 | 948 | 1015 | 1000 | 88 | 76.3 |
| D8 | 0.423 | 892 | 933 | 970 | 82.7 | 76.7 |
| D9 | 0.297 | 962 | 1055 | 1000 | 89.1 | 85.9 |
| D10 | 0.229 | 944 | 1037 | 1020 | 81.3 | 57.5 |
| D11 | 0.334 | 942 | 1021 | 980 | 87.4 | 82.6 |
| D12 | 0.246 | 894 | 939 | 970 | 86.1 | 64.1 |
| D13 | 0.315 | 961 | 1083 | 980 | 88.4 | 74.4 |
| D14 | 0.227 | 985 | #VALUE! | 970 | 79.1 | 72.8 |

TABLE 13

| Steel type | (Vcube + Vgoss + Vr-cube)/ Intensity(max) | Intensity (max, HB)/ Intensity (max, HBA) | {111} grain fraction (volume %) | Iron loss, $W_{15/50}$ (W/Kg) | Magnetic flux density, B50 (T) | Remarks |
|---|---|---|---|---|---|---|
| D1 | 1.1 | 1.48 | 31.7 | 3.12 | 1.75 | Inventive example |
| D2 | 2.27 | 1.23 | 29.8 | 3.01 | 1.73 | Inventive example |
| D3 | 0.81 | 1.73 | 45.3 | 3.92 | 1.66 | Comparative example |
| D4 | 0.74 | 1.94 | 41.6 | 3.75 | 1.67 | Comparative example |
| D5 | 1.86 | 1.35 | 30.9 | 3.36 | 1.74 | Inventive example |
| D6 | 0.54 | 1.88 | 45.2 | 4.32 | 1.69 | Comparative example |
| D7 | 2.13 | 1.27 | 32.8 | 2.99 | 1.73 | Inventive example |
| D8 | 0.63 | 1.72 | 46.8 | 4.5 | 1.69 | Comparative example |
| D9 | 2.31 | 1.36 | 29.6 | 2.91 | 1.73 | Inventive example |
| D10 | 0.86 | 1.93 | 44.7 | 3.81 | 1.67 | Comparative example |
| D11 | 1.46 | 1.35 | 32.5 | 2.83 | 1.72 | Inventive example |
| D12 | 0.76 | 1.97 | 45.2 | 4.53 | 1.68 | Comparative example |
| D13 | 1.65 | 1.36 | 29.5 | 2.76 | 1.72 | Inventive example |
| D14 | 0.65 | 1.65 | 48.6 | 3.84 | 1.66 | Comparative example |

As shown in Table 11 to Table 13, it can be seen that in D1, D2, D5, D7, D9, D11, and D13 satisfying all of the alloy components, and the reduction ratio, front stage reduction ratio, and start temperature of the finishing-milling proposed in the embodiment of the present invention, the texture was properly formed after the final annealing, and Intensity(max, HB)/Intensity(max, HBA) was also formed small.

On the other hand, D3 did not satisfy the reduction ratio, front stage reduction ratio, and start temperature of the finishing-milling. Therefore, the texture was not properly formed, and the value of Intensity(max, HB)/Intensity(max, HBA) was also large. As a result, the magnetism was deteriorated.

D4 did not satisfy the front stage reduction ratio. Therefore, the texture was not properly formed, and the value of Intensity(max, HB)/Intensity(max, HBA) was also large. As a result, the magnetism was deteriorated. D6 did not satisfy the reduction ratio and start temperature of the finishing-milling. Therefore, the texture was not properly formed, and the value of Intensity(max, HB)/Intensity(max, HBA) was also large. As a result, the magnetism was deteriorated.

D8 did not satisfy Formula 1, and the reduction ratio and start temperature of the finishing-milling. Therefore, the texture was not properly formed, and the value of Intensity (max, HB)/Intensity(max, HBA) was also large. As a result, the magnetism was deteriorated.

D10 did not satisfy the reduction ratio and front stage reduction ratio of the finishing-milling. Therefore, the texture was not properly formed, and the value of Intensity (max, HB)/Intensity(max, HBA) was also large. As a result, the magnetism was deteriorated.

D12 did not satisfy the start temperature and front stage reduction ratio of the finishing-milling. Therefore, the texture was not properly formed, and the value of Intensity (max, HB)/Intensity(max, HBA) was also large. As a result, the magnetism was deteriorated.

D14 did not satisfy the start temperature and reduction ratio of the finishing-milling. Therefore, the texture was not properly formed, and the value of Intensity(max, HB)/Intensity(max, HBA) was also large. As a result, the magnetism was deteriorated.

Example 7

A slab including the alloy compositions and the balance of Fe and inevitable impurities summarized in Table 14 below was manufactured. The slab was heated at 1200° C., hot-rolled to a thickness of 2.7 mm, and then wound. The finishing-milling end temperature deviation and the winding temperature were adjusted as shown in Table 15 below. After the hot-rolling, the wound hot-rolled steel sheet was pickled without the hot-rolled sheet annealing, then cold-rolled to a thickness of 0.50 mm, and finally subjected to cold-rolled sheet annealing. In this case, the annealing temperature of the cold-rolled sheet was between 900 to 950° C.

For each specimen, after the final annealing, the microstructure was analyzed to measure the average grain diameter and the area distribution according to the grain diameter, and the iron loss (W15/50) and the magnetic flux density (B50) were also measured, and the results are shown in Table 16 below.

TABLE 14

| Steel type | C | Si | Mn | S | Al | N | Ti | Cu |
|---|---|---|---|---|---|---|---|---|
| E1 | 0.0009 | 0.72 | 0.4 | 0.0025 | 0.0052 | 0.0028 | 0.0035 | 0.019 |
| E2 | 0.0027 | 1.38 | 0.52 | 0.0011 | 0.0014 | 0.0007 | 0.0021 | 0.01 |
| E3 | 0.0021 | 0.96 | 0.22 | 0.0022 | 0.0014 | 0.003 | 0.0013 | 0.008 |
| E4 | 0.0009 | 1.68 | 0.86 | 0.0007 | 0.008 | 0.0042 | 0.0008 | 0.015 |
| E5 | 0.0014 | 0.68 | 0.55 | 0.0026 | 0.0048 | 0.0036 | 0.0012 | 0.016 |
| E6 | 0.0031 | 0.93 | 0.41 | 0.0032 | 0.0071 | 0.0036 | 0.0017 | 0.005 |
| E7 | 0.0037 | 1.55 | 0.82 | 0.0043 | 0.014 | 0.0012 | 0.0009 | 0.007 |
| E8 | 0.0039 | 1.67 | 0.53 | 0.0008 | 0.0088 | 0.0009 | 0.0032 | 0.01 |
| E9 | 0.0015 | 1.95 | 0.64 | 0.0015 | 0.0028 | 0.0022 | 0.0014 | 0.016 |
| E10 | 0.0011 | 2.28 | 1.1 | 0.0017 | 0.0012 | 0.0009 | 0.0043 | 0.007 |
| E11 | 0.0026 | 1.75 | 0.68 | 0.0053 | 0.0052 | 0.0032 | 0.0022 | 0.014 |
| E12 | 0.0015 | 1.23 | 0.44 | 0.0027 | 0.0009 | 0.0013 | 0.0031 | 0.002 |
| E13 | 0.0011 | 2.36 | 0.93 | 0.0032 | 0.0033 | 0.0025 | 0.0036 | 0.013 |
| E14 | 0.0043 | 1.21 | 0.53 | 0.0027 | 0.007 | 0.0021 | 0.0036 | 0.01 |

TABLE 15

| Steel type | [Mn]/([Si] + 150 × [Al]) | $FDT_{Max}$-$FDT_{Min}$ | CT × [Si]/1000 |
|---|---|---|---|
| E1 | 0.267 | 22 | 0.55 |
| E2 | 0.327 | 29 | 0.86 |
| E3 | 0.188 | 47 | 0.61 |
| E4 | 0.299 | 18 | 1.13 |
| E5 | 0.393 | 28 | 0.48 |
| E6 | 0.206 | 27 | 0.67 |
| E7 | 0.225 | 26 | 1.15 |
| E8 | 0.177 | 34 | 1.1 |
| E9 | 0.27 | 23 | 1.27 |
| E10 | 0.447 | 53 | 1.71 |
| E11 | 0.269 | 24 | 1.24 |
| E12 | 0.322 | 20 | 0.84 |
| E13 | 0.326 | 16 | 1.7 |
| E14 | 0.235 | 42 | 0.91 |

TABLE 16

| Steel type | Average grain particle size (μm) | Fine grain area ratio (%) | Coarse grain area ratio (%) | {111} grain fraction (volume %) | Iron loss, $W_{15/50}$ (W/Kg) | Magnetic flux density, $B_{50}$ (T) | Remarks |
|---|---|---|---|---|---|---|---|
| E1 | 62 | 0.38 | 38 | 31.7 | 3.26 | 1.74 | Inventive example |
| E2 | 85 | 0.38 | 36 | 32.0 | 3.01 | 1.74 | Inventive example |
| E3 | 69 | 0.36 | 44 | 42.6 | 4.28 | 1.68 | Comparative example |
| E4 | 73 | 0.21 | 21 | 29.9 | 2.99 | 1.74 | Inventive example |
| E5 | 82 | 0.5 | 39 | 50.8 | 4.46 | 1.67 | Comparative example |
| E6 | 78 | 0.22 | 22 | 30.2 | 3.15 | 1.73 | Inventive example |
| E7 | 47 | 0.53 | 27 | 40.5 | 3.96 | 1.67 | Comparative example |
| E8 | 77 | 0.45 | 41 | 44.2 | 4.11 | 1.68 | Comparative example |
| E9 | 59 | 0.29 | 37 | 33.2 | 2.89 | 1.72 | Inventive example |
| E10 | 48 | 0.43 | 50 | 48.7 | 3.77 | 1.67 | Comparative example |

TABLE 16-continued

| Steel type | Average grain particle size (μm) | Fine grain area ratio (%) | Coarse grain area ratio (%) | {111} grain fraction (volume %) | Iron loss, $W_{15/50}$ (W/Kg) | Magnetic flux density, $B_{50}$ (T) | Remarks |
|---|---|---|---|---|---|---|---|
| E11 | 44 | 0.48 | 31 | 51.1 | 3.79 | 1.67 | Comparative example |
| E12 | 70 | 0.32 | 33 | 34.4 | 3.31 | 1.74 | Inventive example |
| E13 | 84 | 0.38 | 37 | 30.1 | 2.74 | 1.71 | Inventive example |
| E14 | 86 | 0.42 | 47 | 46.3 | 4.16 | 1.68 | Comparative example |

As shown in Table 14 to Table 16, it can be confirmed that in E1, E2, E4, E6, E9, E12, and E13 satisfying all of the alloy composition, the finishing-milling end temperature deviation, and the winding temperature proposed in the embodiment of the present invention, after the final annealing, the grain diameter and distribution were appropriate.

On the other hand, E3 did not satisfy the content of Mn and Formula 1, and did not satisfy the finishing-milling end temperature deviation. Therefore, the grain diameter and distribution were not properly formed. As a result, it can be confirmed that the magnetism was deteriorated.

E5 did not satisfy Formula 1 and the winding temperature. Therefore, the grain diameter and distribution were not properly formed. As a result, it can be confirmed that the magnetism was deteriorated.

E7 did not satisfy the content of Al. Therefore, the grain diameter and distribution were not properly formed. As a result, it can be confirmed that the magnetism was deteriorated.

E8 did not satisfy Formula 1 and the finishing-milling end temperature deviation. Therefore, the grain diameter and distribution were not properly formed. As a result, it can be confirmed that the magnetism was deteriorated.

E10 did not satisfy the content of Mn and Formula 1, and did not satisfy the finishing-milling end temperature deviation. Therefore, the grain diameter and distribution were not properly formed. As a result, it can be confirmed that the magnetism was deteriorated.

E11 did not satisfy the content of S. Therefore, the grain diameter and distribution were not properly formed. As a result, it can be confirmed that the magnetism was deteriorated.

E14 did not satisfy the finishing-milling end temperature deviation. Therefore, the grain diameter and distribution were not properly formed. As a result, it can be confirmed that the magnetism was deteriorated.

Example 8

A slab including the alloy compositions and the balance of Fe and inevitable impurities summarized in Table 17 below were manufactured. The slab was heated at 1100 to 1200° C., hot-rolled to a thickness of 2.8 mm, and then wound. The finishing-milling end temperature deviation and the winding temperature were adjusted as shown in Table 18 below. After the hot-rolling, the wound hot-rolled steel sheet was pickled without the hot-rolled sheet annealing, then cold-rolled to a thickness of 0.50 mm, and finally subjected to cold-rolled sheet annealing. In this case, the annealing temperature of the cold-rolled sheet was between 900 to 950° C.

For each specimen, after the hot-rolling, the microstructure was analyzed to measure the grain diameters of the center portion and the surface portion, and the recrystallized fraction was also measured, and the results are summarized in Table 18 below. In addition, after the final annealing, the microstructure was analyzed to measure the average grain size and the area distribution according to the grain size, and the iron loss (W15/50) and the magnetic flux density (B50) were also measured, and the results are shown in Table 19 below.

TABLE 17

| Steel type | C | Si | Mr | P | S | Al | N | Ti | Sn | Cu |
|---|---|---|---|---|---|---|---|---|---|---|
| F1 | 0.0039 | 2.29 | 0.82 | 0 | 0.0033 | 0.0018 | 0.0025 | 0.0029 | 0.03 | 0.016 |
| F2 | 0.0008 | 0.97 | 0.46 | 0 | 0.0012 | 0.0024 | 0.0027 | 0.0011 | 0.05 | 0.013 |
| F3 | 0.0029 | 1.27 | 0.59 | 0.07 | 0.0039 | 0.0032 | 0.0009 | 0.0005 | 0.06 | 0.003 |
| F4 | 0.0042 | 2.01 | 0.63 | 0.01 | 0.0019 | 0.0074 | 0.0031 | 0.0036 | 0.04 | 0.017 |
| F5 | 0.0031 | 2.4 | 0.87 | 0.05 | 0.0009 | 0.0096 | 0.0009 | 0.0005 | 0.03 | 0.02 |
| F6 | 0.0039 | 0.86 | 0.41 | 0.03 | 0.004 | 0.008 | 0.0018 | 0.0029 | 0.03 | 0.008 |
| F7 | 0.0009 | 1.65 | 0.55 | 0.03 | 0.0024 | 0.0068 | 0.0022 | 0.0018 | 0.02 | 0.017 |
| F8 | 0.0027 | 1.99 | 0.68 | 0.04 | 0.0017 | 0.002 | 0.0025 | 0.0015 | 0.1 | 0.018 |
| F9 | 0.0032 | 0.92 | 0.51 | 0 | 0.0039 | 0.0019 | 0.0035 | 0.0027 | 0 | 0.007 |
| F10 | 0.0021 | 1.67 | 0.68 | 0.08 | 0.003 | 0.0087 | 0.0009 | 0.0026 | 0 | 0.009 |
| F11 | 0.0007 | 2.23 | 0.93 | 0 | 0.0023 | 0.0037 | 0.0023 | 0.0006 | 0 | 0.01 |
| F12 | 0.0024 | 2.34 | 0.94 | 0.04 | 0.001 | 0.0043 | 0.0029 | 0.0018 | 0.06 | 0.012 |
| F13 | 0.0023 | 0.76 | 0.46 | 0.04 | 0.0018 | 0.0074 | 0.0038 | 0.0032 | 0.05 | 0.013 |

TABLE 18

| Steel type | [Mn]/([Si] + 150 × [Al]) | $FDT_{Max}$-$FDT_{Min}$ | CT × [Si]/1000 | $GS_{center}$/$GS_{surface}$ | $GS_{center}$ × Recrystallization rate/10 |
|---|---|---|---|---|---|
| F1 | 0.32 | 36 | 1.51 | 1.03 | 2.8 |
| F2 | 0.346 | 25 | 0.66 | 1.54 | 4 |
| F3 | 0.337 | 16 | 0.88 | 1.28 | 3.6 |
| F4 | 0.202 | 42 | 1.23 | 1.06 | 1.8 |
| F5 | 0.227 | 29 | 1.82 | 1.06 | 3.6 |
| F6 | 0.199 | 17 | 0.65 | 1.47 | 3.8 |
| F7 | 0.206 | 28 | 1.16 | 1.21 | 3.4 |
| F8 | 0.297 | 25 | 1.43 | 1.44 | 3.2 |
| F9 | 0.423 | 36 | 0.54 | 1.12 | 1.7 |
| F10 | 0.229 | 36 | 1.12 | 1.17 | 1.9 |
| F11 | 0.334 | 25 | 1.47 | 1.29 | 2.6 |
| F12 | 0.315 | 25 | 1.68 | 1.6 | 3.4 |
| F13 | 0.246 | 40 | 0.46 | 1.06 | 1.9 |

TABLE 19

| Steel type | Average grain particle size (μm) | Fine grain area ratio (%) | Coarse grain area ratio (%) | {111} grain fraction (volume %) | Iron loss, $W_{15/50}$ (W/Kg) | Magnetic flux density, $B_{50}$ (T) | Remarks |
|---|---|---|---|---|---|---|---|
| F1 | 52 | 0.51 | 27 | 48.1 | 3.66 | 1.66 | Comparative example |
| F2 | 62 | 0.32 | 30 | 32.1 | 3.03 | 1.74 | Inventive example |
| F3 | 71 | 0.31 | 21 | 30.5 | 3.06 | 1.74 | Inventive example |
| F4 | 46 | 0.45 | 24 | 44.0 | 3.85 | 1.67 | Comparative example |
| F5 | 69 | 0.4 | 49 | 46.1 | 3.77 | 1.66 | Comparative example |
| F6 | 72 | 0.24 | 27 | 33.0 | 3.26 | 1.73 | Inventive example |
| F7 | 52 | 0.33 | 38 | 33.7 | 3.02 | 1.74 | Inventive example |
| F8 | 76 | 0.21 | 25 | 29.1 | 2.94 | 1.73 | Inventive example |
| F9 | 60 | 0.5 | 41 | 43.2 | 4.48 | 1.68 | Comparative example |
| F10 | 45 | 0.43 | 44 | 41.1 | 3.69 | 1.68 | Comparative example |
| F11 | 74 | 0.24 | 29 | 28.9 | 2.85 | 1.71 | Inventive example |
| F12 | 79 | 0.3 | 32 | 29.5 | 2.82 | 1.72 | Inventive example |
| F13 | 44 | 0.48 | 43 | 48.3 | 4.39 | 1.67 | Comparative example |

As shown in Table 17 to Table 19, it can be confirmed that in F2, F3, F6, F7, F8, F11, and F12 satisfying all of the alloy composition, the finishing-milling end temperature deviation, and the winding temperature proposed in the embodiment of the present invention, and after the final annealing, the microstructure of the hot-rolled sheet was properly formed, and the grain diameter and distribution were appropriate.

On the other hand, F1 did not satisfy the finishing-milling end temperature deviation. Therefore, the microstructure of the hot-rolled sheet, and the grain diameter and distribution, were not properly formed. As a result, it can be confirmed that the magnetism was deteriorated.

F4 did not satisfy the finishing-milling end temperature deviation. Therefore, the microstructure of the hot-rolled sheet, and the grain diameter and distribution, were not properly formed. As a result, it can be confirmed that the magnetism was deteriorated.

F5 did not satisfy the winding temperature. Therefore, the microstructure of the hot-rolled sheet, and the grain diameter and distribution, were not properly formed. As a result, it can be confirmed that the magnetism was deteriorated.

F9 did not satisfy Formula 1, the finishing-milling end temperature deviation, and the winding temperature. Therefore, the microstructure of the hot-rolled sheet, and the grain diameter and distribution, were not properly formed. As a result, it can be confirmed that the magnetism was deteriorated.

F10 did not satisfy the finishing-milling end temperature deviation. Therefore, the microstructure of the hot-rolled sheet, and the grain diameter and distribution, were not properly formed. As a result, it can be confirmed that the magnetism was deteriorated.

F13 did not satisfy Formula 1, the finishing-milling end temperature deviation, and the winding temperature. Therefore, the microstructure of the hot-rolled sheet, and the grain diameter and distribution, were not properly formed. As a result, it can be confirmed that the magnetism was deteriorated.

The present invention may be embodied in many different forms, and should not be construed as being limited to the disclosed embodiments. In addition, it will be understood by those skilled in the art that various changes in form and details may be made thereto without departing from the technical spirit and essential features of the present invention. Therefore, it is to be understood that the above-described embodiments are for illustrative purposes only, and the scope of the present invention is not limited thereto.

The invention claimed is:

1. A non-oriented electrical steel sheet comprising, in wt %, C at 0.005% or less (excluding 0%), Si at 0.5 to 2.4%, Mn at 0.4 to 1.0%, S at 0.005% or less (excluding 0%), Al at 0.01% or less (excluding 0%), N at 0.005% or less (excluding 0%), Ti at 0.005% or less (excluding 0%), Cu at 0.001 to 0.02%, and the balance of Fe and inevitable impurities, wherein a volume fraction of grains in which an angle formed by a {111} surface and a rolling surface of the steel sheet is 15° or less is 27% or more, wherein 0.9≤(Vcube+Vgoss+Vr-cube)/Intensitymax≤2.5 is satisfied, wherein Vcube, Vgoss, and Vr-cube are vol % of a texture of a cube, a goss, and a rotated cube, respectively, and Intensitymax represents a maximum intensity value on an ODF (orientation distribution function) image (Φ2=45 degree section).

2. The non-oriented electrical steel sheet of claim 1, wherein a volume fraction of grains in which an angle formed by a {111} surface and a rolling surface of the steel sheet is 15° or less is 27% to 32%.

3. The non-oriented electrical steel sheet of claim 1, wherein a concentration layer including a Si oxide exists in a depth range of 0.15 μm or less from a surface.

4. The non-oriented electrical steel sheet of claim 3, wherein the concentration layer includes Si at 3 wt % or more, O at 5 wt % or more, and Al at 0.5 wt % or less.

5. The non-oriented electrical steel sheet of claim 1, wherein sulfides are included, and a product ($F_{count}$×$F_{area}$) of a number ratio ($F_{count}$) of first sulfides having a diameter of 0.05 μm or more among second sulfides having a diameter of 0.5 μm or less and an area ratio ($F_{area}$) of first sulfides among second sulfides having a diameter of 0.5 μm or less is 0.15 or more.

6. The non-oriented electrical steel sheet of claim 1, wherein sulfides are included, and a number ratio ($F_{count}$) of first sulfides having a diameter of 0.05 μm or more among second sulfides having a diameter of 0.5 μm or less is 0.2 or more.

7. The non-oriented electrical steel sheet of claim 1, wherein an area ratio ($F_{area}$) of first sulfides having a diameter of 0.05 μm or more among second sulfides having a diameter of 0.5 μm or less is 0.5 or more.

8. The non-oriented electrical steel sheet of claim 1, wherein

YP/TS≥0.7 is satisfied, and wherein YP stands for a yield strength and TS stands for a tensile strength.

9. The non-oriented electrical steel sheet of claim 1, wherein an area ratio of fine grains having a diameter that is 0.3 times or less of an average grain diameter is 0.4% or less, and an area ratio of coarse grains having a diameter that is two or more times of the average grain diameter is 40% or less.

10. The non-oriented electrical steel sheet of claim 1, wherein the average grain diameter is 50 to 100 μm.

11. The non-oriented electrical steel sheet of claim 1, wherein the non-oriented electrical steel sheet satisfies Formula 1 below:

$$[Mn]/([Si]+150\times[Al])\leq 0.35 \quad \text{[Formula 1]}$$

wherein in Formula 1, [Mn], [Si], and [Al] are contents, wt %, of Mn, Si, and Al, respectively.

12. The non-oriented electrical steel sheet of claim 1, comprising Cu at 0.001 to 0.016 wt %.

* * * * *